US012735845B2

(12) United States Patent
Taniguchi

(10) Patent No.: US 12,735,845 B2
(45) Date of Patent: Sep. 15, 2026

(54) SOIL PAVING MATERIAL AND SOIL PAVING METHOD

(71) Applicant: Mami Taniguchi, Nisshin (JP)

(72) Inventor: Mami Taniguchi, Nisshin (JP)

( * ) Notice: Subject to any disclaimer, the term of this patent is extended or adjusted under 35 U.S.C. 154(b) by 625 days.

(21) Appl. No.: 18/269,577

(22) PCT Filed: Dec. 10, 2021

(86) PCT No.: PCT/JP2021/045504
§ 371 (c)(1),
(2) Date: Jun. 26, 2023

(87) PCT Pub. No.: WO2022/145198
PCT Pub. Date: Jul. 7, 2022

(65) Prior Publication Data

US 2024/0060246 A1 Feb. 22, 2024

(30) Foreign Application Priority Data

Dec. 30, 2020 (JP) ................................ 2020-219904

(51) Int. Cl.
*E01C 7/36* (2006.01)
*C09K 17/06* (2006.01)

(52) U.S. Cl.
CPC ................ *E01C 7/36* (2013.01); *C09K 17/06* (2013.01)

(58) Field of Classification Search
CPC ........................................................ E01C 9/00
See application file for complete search history.

(56) References Cited

U.S. PATENT DOCUMENTS 7,922,810 B2 4/2011 Atoon
2020/0361820 A1* 11/2020 Moradi Khou ........... C04B 7/32

FOREIGN PATENT DOCUMENTS

JP 09-087621 A 3/1997
JP 2001-81308 A 3/2001
JP 2010-281140 A 12/2010
JP 2014-58774 A 4/2014

OTHER PUBLICATIONS

Chijioke Christopher Ikeagwuani et al., Emerging Trends in Expansive Soil Stabilisation: A Review, Journal of Rock Mechanics and Geotechnical Engineering [online/open access], Jan. 11, 2019, pp. 423-440, vol. 11 (2019), Elsevier B.V. for the Institute of Rock and Soil Mechanics, Chinese Academy of Sciences.
Suwimol Asavapisit et al. , The Role of RHA-Blended Cement in Stabilizing Metal-Containing Wastes, Cement and Concrete Composites [online], Aug.-Sep. 2005, pp. 782-787, vol. 27, Elsevier Ltd.

* cited by examiner

*Primary Examiner* — Austin Murata
(74) *Attorney, Agent, or Firm* — j-pat U.S. Patent Legal Services; James W. Judge

(57) ABSTRACT

Problem: To provide a technique suitable for the circular economy that allows reduction of the environmental load. Solution: A soil paving material for paving soil on topsoil includes a stone dust 110, a baked rice bran 120, and a solidifying material 130. The stone dust 110 is produced when a stone material is processed. The baked rice bran 120 is produced by baking rice bran into a carbonized state. The solidifying material 130 used for the soil paving material includes at least one of a calcined plaster and a hydrated lime.

12 Claims, 3 Drawing Sheets

SOIL PAVING MATERIAL AND SOIL PAVING METHOD

TECHNICAL FIELD

The present invention relates to a soil paving technique, and more particularly to a soil paving technique that enables reduction of environmental load.

BACKGROUND ART

Recently, as a paving method that is excellent in harmony with the natural environment and has a high water-permeability and a high shock-absorbency, soil pavement (soil-based pavement) mainly composed of natural soil such as soil and sand has been attracting attention. In the soil pavement, cement (Portland cement) is generally used as the hardening material (binder) to be mixed with the natural soil. However, when an amount of use of cement increases, the advantages of soil pavement, such as harmony with the natural environment, are impaired. Therefore, various attempts have been made to reduce the amount of cement used in soil pavement in order to take advantage of the soil pavement (see, for example, Patent Document 1).

PRECEDENT TECHNICAL LITERATURE

Patent Documents

Patent Document 1: Japanese Unexamined Pat. App. Pub. No. H09-87621

SUMMARY OF INVENTION

Issues Invention is to Address

However, since a raw material of cement is heated to a high temperature during its production, trivalent chromium contained in the raw material is oxidized to produce hexavalent chromium. Hexavalent chromium produced in this way is usually confined in the hydrates produced during cement solidification. Thus, the dissolution of hexavalent chromium is sufficiently suppressed. However, when cement is used for soil pavement, hexavalent chromium is possibly dissolved into the environment depending on the type of natural soil mixed therewith and the condition of construction of the soil pavement.

In addition, asphalt, resin, or the like is used as a binder in the soil pavement without using cement. When the deteriorated soil pavement is repaired or when the original state is restored from the soil pavement, the removed soil pavement is discharged as waste. As a result, soil pavement using asphalt, resin, or the like has recently become not necessarily compatible with the circular economy, which has been sought to achieve.

Accordingly, although the conventional soil paving techniques have the advantage of harmonizing with the natural environment in appearance, it is not necessarily suitable for the circular economy, and the environmental load is not sufficiently reduced.

The present invention has been made to solve the above-described conventional problems, and an object of the present invention is to provide a soil paving technique that allows reduction of the environmental load.

Means for Addressing the Issues

In order to achieve at least a part of the above-described object, the present invention is achievable as the following forms or application examples.

Application Example 1

A soil paving material for paving soil on topsoil incudes:

- a stone dust produced when a stone material is processed;
- a baked rice bran produced by baking rice bran into a carbonized state; and
- a solidifying material, wherein the solidifying material includes at least one of a calcined plaster and a hydrated lime.

According to this application example, the use of the stone dust and the baked rice bran for the soil paving material increases the water permeability and the shock absorbency while keeping durability of the soil pavement. The stone dust, which has been discharged as an industrial waste of the stone processing, and the rice bran, which has been discharged as an industrial waste of the rice milling, are effectively used without being discarded. Also, the stone dust, the baked rice bran, and the calcined plaster and the hydrated lime as the solidifying material are all naturally harmless, and therefore do not need to be discharged as waste when removing the soil pavement. Therefore, this application example allows the soil pavement suitable for the circular economy, thus further reducing the environmental load of the soil pavement.

Application Example 2

The soil paving material according to the application example 1, wherein the soil paving material contains the baked rice bran at a mix proportion of 80 to 120 in volume to 100 in volume of the stone dust and contains the solidifying material at a mix proportion of 20 to 80 in volume to 100 in volume of the stone dust.

This application example allows performing the soil pavement more appropriately.

Application Example 3

The soil paving material according to the application example 1 or 2, wherein the stone material includes an intermediate rock or an acid rock.

This application example allows suppressing alkalinization of the topsoil or the like.

Application Example 4

A soil paving method for paving soil on topsoil includes:

- a step of preparing a slurry by kneading the soil paving material according to any of claims 1 to 3, sand, and water; and
- a step of laying the slurry on the topsoil.

According to this application example, laying the slurry on the topsoil achieves the soil pavement, thus allowing the further facilitated construction of the soil pavement.

Application Example 5

A soil paving method for paving soil on topsoil includes:

a step of preparing a slurry by kneading the soil paving material according to any of claims 1 to 3, and water;

a step of laying the slurry on the topsoil; and a step of mixing the slurry and a surface layer of the topsoil before the slurry solidifies.

This application example allows to omitting transportation or the like of the sand to the construction site of the soil pavement, thus facilitating the soil pavement on for large areas.

MODES FOR IMPLEMENTING INVENTION

Aspects to embody the present invention are described below in the following order.

A. First Embodiment
  A1. Application Aspect of Soil Pavement
  A2. Method of Soil Pavement
  A3. Examples
B. Second Embodiment
C. Modification

A. First Embodiment

A1. Application Aspect of Soil Pavement

Figure 1A:
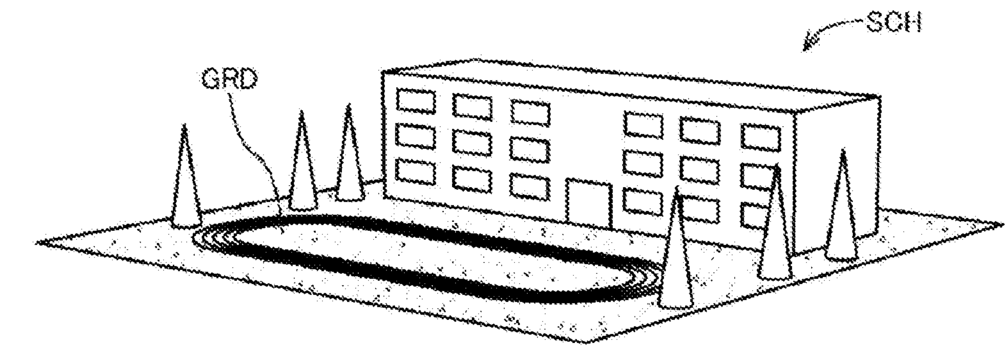
FIG. 1A is an explanatory view illustrating one application aspect of a first embodiment of the present invention.
Figure 1B:
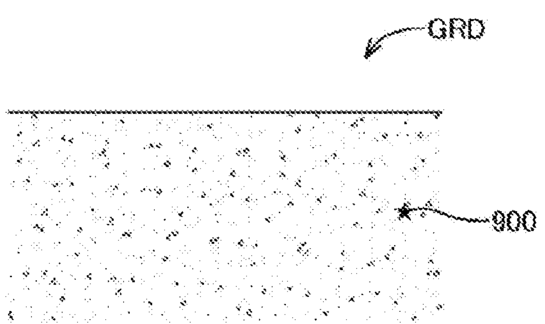
FIG. 1B is an explanatory view illustrating the one application aspect of the first embodiment of the present invention.
Figure 1C:
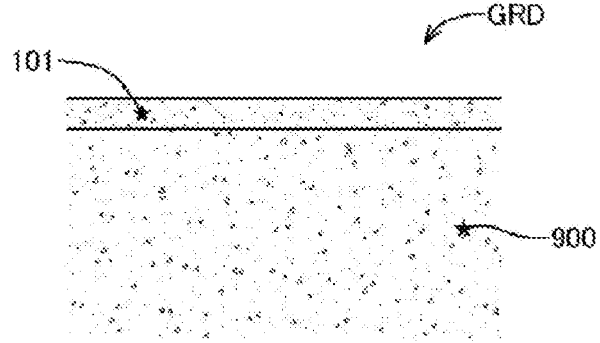
FIG. 1C is an explanatory view illustrating the one application aspect of the first embodiment of the present invention.

FIG. 1A to FIG. 1C are explanatory views illustrating one application aspect of a soil pavement as the first embodiment of the present invention. FIG. 1A illustrates a ground GRD on which the soil pavement is to be performed of a school SCH. FIG. 1B illustrates a state of a surface layer of the ground GRD before the soil pavement is performed, and FIG. 1C illustrates a state of the surface layer of the ground GRD after the soil pavement is performed.

As shown in FIG. 1B, a topsoil 900 is exposed from the surface layer of the ground GRD before the soil pavement is performed. As a result, there is a risk that rain water makes the topsoil 900 muddy and makes it difficult to use the ground GRD or the topsoil 900 of the ground GRD scatters and adversely affects the school SCH and its surroundings with the scattered dust. Meanwhile, as shown in FIG. 1C, performing the soil pavement coats the topsoil 900 of the surface layer of the ground GRD with the soil pavement layer 101, thus reducing the muddied or scattered topsoil 900.

Accordingly, when the soil pavement is performed by forming the soil pavement layer 101 coating the topsoil 900, forming the soil pavement layer 101 using an appropriately prepared soil paving material (described later) allows increasing the water permeability and the shock absorbency of the soil pavement layer 101 while keeping durability of the soil pavement layer 101. Therefore, it is possible to reduce the muddied or scattered soil pavement layer 101 itself while it is possible to reduce users of the ground GRD such as students from breaking down or being injured.

In the example of FIG. 1A to FIG. 1C, the soil pavement performed on the ground GRD of the school SCH is illustrated as the one application aspect of the first embodiment. However, the soil pavement of the first embodiment may be performed on various places where problems, such as muddying, scattering, or outflowing of the topsoil and failure problems due to impact from the paved surface could occur. In addition to school grounds, the various places include paths of parks, amusement parks, and the like, or structures such as hills in amusement parks, the surfaces of ancient tombs, and the like.

Since these types of places are usually not suitable for asphalt pavement or concrete pavement because the water permeability and the shock absorbency are required, the soil pavement is performed. As will be described later, since the soil pavement of the first embodiment achieves the higher water permeability and shock absorbency, the first embodiment is particularly suitable for locations unsuitable for asphalt pavement or concrete pavement.

A2. Method of Soil Pavement

Figure 2A:
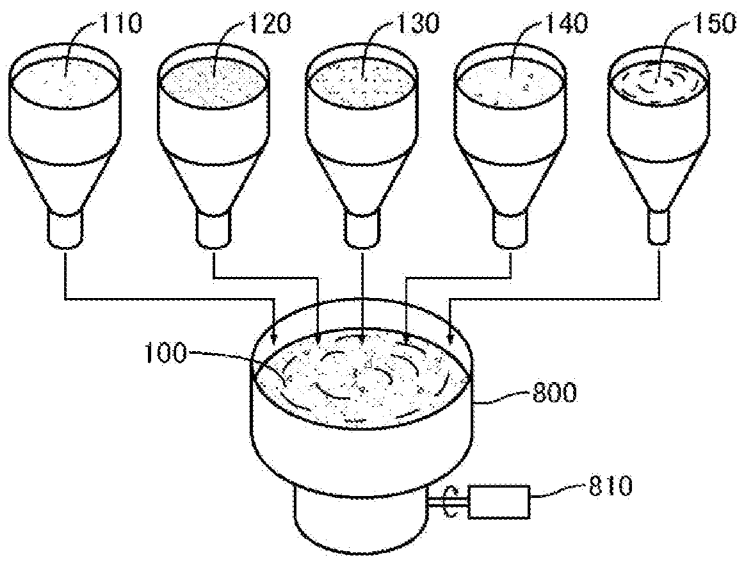
FIG. 2A is an explanatory view illustrating a soil pavement performed as the first embodiment.
Figure 2B:
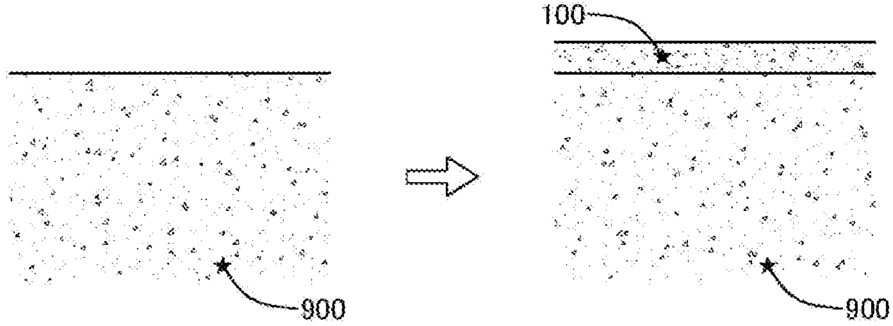
FIG. 2B is an explanatory view illustrating the soil pavement performed as the first embodiment.

FIG. 2A to FIG. 2B are explanatory views illustrating a soil pavement performed as the first embodiment. FIG. 2A illustrates a preparation of a slurry 100 for forming the soil pavement layer 101 (see FIG. 1C), and FIG. 2B illustrates a step of performing the soil pavement on the topsoil 900 using the slurry 100.

The soil paving material is constituted of a stone dust 110, a rice bran (a baked rice bran) 120 having undergone a heat treatment process (baking), and a calcined plaster 130. Therefore, in the first embodiment, as shown in FIG. 2A, the stone dust 110, the baked rice bran 120, and the calcined plaster 130, which constitute the soil paving material, a mountain sand 140 as fine aggregate, and water 150 are introduced into a mixer 800, and the introduced mixture is stirred by a motor 810 provided in the mixer 800. This prepares the slurry 100 containing the stone dust 110, the baked rice bran 120, and the calcined plaster 130 as the soil paving material, the mountain sand 140, and the water 150.

Here, the stone dust contains chips produced at the time processing of a stone material, such as cutting. The stone dust contains finer particles than the sand, such as the mountain sand and becomes a material that ensures the durability in the soil paving material. The stone dust used as the soil paving material may employ stone dusts produced during the processing of various stone materials including igneous rocks, such as granite, basalt, and andesite, sedimentary rocks, such as hard sandstone, and metamorphic rocks, such as gneiss. As the stone dust, it is also possible to use a mixture of stone dusts produced by processing different types of the stone materials.

However, as the stone dust, it is preferred to use a stone dust produced when processing a stone material composed of a rock with low basicity, that is, an intermediate rock, such as andesite, or an acid rock, such as granite. As described above, since the stone dust has become a powder of the fine particles, the particle size of minerals in rocks does not affect the property of the stone dust. Therefore, as the intermediate rock and the acid rock, other igneous rocks having a composition similar to andesite, granite, or the like, sedimentary rocks (for example, hard sandstone), or metamorphic rocks may be used. This allows suppressing alkalinization of the soil pavement layer 101 (FIG. 1C) and the surface soil 900 covered with the soil pavement layer 101 due to the basicity of the stone dust.

The baked rice bran is a material that ensures the water permeability and the shock absorbency in the soil paving material, and the baked rice bran that is baked into a carbonized state such that the carbon content becomes about 30 to 50% by weight is used. When the mix proportion of the baked rice bran in the soil pavement material is increased, the durability of the soil pavement layer 101 (FIG. 1C) in which the slurry 100 is solidified is decreased. When the mix proportion of the baked rice bran is decreased, the water permeability and the shock absorbency of the soil pavement layer 101 are decreased. Considering such a property, the mix proportion of the baked rice bran in the soil paving material is set to, for example, 80 to 120 in volume of the baked rice bran to 100 in volume of the stone dust.

The calcined plaster is a hemihydrate ($CaSO_4 \cdot ½H_2O$) produced by heat-treating plaster ($CaSO_4 \cdot 2H_2O$) as a dihydrate of calcium sulfate ($CaSO_4$). The calcined plaster is a material (solidifying material) that solidifies the slurry 100 by hydration. As the calcined plaster, in addition to commercially available one as a calcined plaster, a plaster produced by calcining commercially available plaster can be used. When a mix proportion of the calcined plaster in the soil pavement material is increased, the soil pavement layer 101 (FIG. 1C) in which the slurry 100 is solidified becomes excessively hard. When the mix proportion of the calcined plaster is decreased, it becomes difficult to solidify the soil pavement layer 101. Considering such a property, the mix proportion of the calcined plaster in the soil paving material is set to, for example, 20 to 80 in volume of the calcined plaster to 100 in volume of the stone dust.

In the first embodiment, the calcined plaster is used as a solidifying material for solidifying the slurry 100 by hydration. It is also possible to use the hydrated lime instead of the calcined plaster. Also in this case, a mix proportion of the hydrated lime in the soil paving material is set to, for example, 20 to 80 in volume of the calcined plaster to 100 in volume of the stone dust. In addition, instead of the calcined plaster alone or the hydrated lime alone, it is also possible to use a solidifying material obtained by mixing the calcined plaster and the hydrated lime at an arbitrary proportion. Also in this case, a mix proportion of the solidifying material is set in the same manner as the calcined plaster and the hydrated lime.

When the slurry 100 is prepared, mix proportions of the mountain sand and water mixed with the soil paving material are appropriately adjusted according to a target hardness of the slurry 100, the properties of the mountain sand, and the like. In general, the mix proportions of the mountain sand and water in the slurry 100 are set to 200 to 800 in volume of the mountain sand and 50 to 300 in volume of water to 100 in volume of the stone dust. In the first embodiment, the mountain sand is used as the fine aggregate. It is also possible to use various sands, such as river sand, sea sand, crushed sand, or the like in addition to the mountain sand as the fine aggregate.

Furthermore, appropriately setting a mix proportion of the mountain sand allows adjusting a hardness of the soil pavement layer 101 (FIG. 1C) obtained by solidifying the slurry 100. Specifically, when the mix proportion of mountain sand is increased, the soil pavement layer becomes softened, and the properties as the soil pavement, such as the high impact absorption property are strongly exhibited. Meanwhile, when the mix proportion of the mountain sand is decreased, the impact absorption property and the like are decreased. However, the soil pavement layer becomes hard and allows using for suppressing overgrowth of weeds or the like. Furthermore, forming a hard soil pavement layer in this way allows using a pavement means as a substitute for asphalt pavement or concrete pavement while reducing the environmental load as described later.

The prepared slurry 100 is laid on topsoil 900 as shown in FIG. 2B. Then, the slurry 100 laid on the topsoil 900 solidifies and becomes a fixed soil pavement layer 101 and covers the topsoil 900 with the soil pavement layer 101 as shown in FIG. 1C.

As described above, the first embodiment allows performing the soil pavement having the increased water permeability and shock absorbency and the sufficient durability. Then, the stone dust produced during the stone processing and the rice bran produced during the rice polishing are effectively utilized without being discarded. Therefore, performing the soil pavement according to the first embodiment allows contributing to realization of the recycling-oriented society (circular economy) and allows further reducing the environmental load caused by the soil pavement.

In addition, among the stone dust, the baked rice bran, and the calcined plaster/the hydrated lime that constitute the soil paving material, the stone dust and the hydrated lime are not heat-treated, and the baked rice bran and the calcined plaster, which are produced by heat treatment, are produced by a heat treatment at a low temperature (500° C. or less). Therefore, the soil paving material does not contain a harmful substance generated at high temperature such as hexavalent chromium, and the soil paving material is harmless to the natural environment.

Calcium contained in the calcined plaster and the hydrated lime is supplied to the topsoil as a nutrient for plants, and is effective as a soil improvement material. When repairing deteriorated the soil pavement or when restoring to an original state in which the topsoil is exposed, it is sufficient to crush the soil pavement layer 101 and mix it with the topsoil 900, and it is not necessary to remove the soil pavement layer 101 and discharge it as waste. Therefore, the first embodiment allows performing the soil pavement suitable for the circular economy and effectively suppressing the increase in environmental load due to the soil pavement, thus allowing the effectively reduced environmental load due to the soil pavement.

A3. Examples

In order to confirm that the appropriate soil paving is possible using the soil paving material according to the present invention, a slurry was prepared, a solidification state of the prepared slurry was evaluated, and water resistance was evaluated for confirming whether the solidified slurry is stably fixed or not.

Specifically, 100 ml of the stone dust, 100 ml of the baked rice bran, and 50 ml of the solidifying material were kneaded with the mountain sand and water in a vessel to prepare slurries of Examples (Examples 1 to 4). When preparing the slurry, the calcined plaster (Examples 1 and 2) and the hydrated lime (Examples 3 and 4) were each used as the solidifying material. In the slurries of Examples 1 and 3, 300 ml of the mountain sand and 75 ml of water were mixed, and in the slurries of Examples 2 and 4, 600 ml of the mountain sand and 200 ml of water were mixed.

Also, as a comparative example, the mixed amounts of the stone dust, the baked rice bran, the solidifying material, the mountain sand, and water were set in the same manner as in the examples, and slurries (comparative examples A and B) using the plaster as the solidifying material were prepared in the same manner as in the examples.

Then, the obtained slurries of Examples and Comparative Examples were poured into a box, and states of the solidification and the water resistances of the slurries were evaluated after 24 hours. The water resistances were evaluated by pouring water over the solidified samples. Table 1 below shows the mixed amounts of the respective components in the slurries, the types of the solidifying materials, the states of solidification of the slurries, and the evaluation results of the water resistance for Examples and Comparative Examples.

TABLE 1

| | Mixed amount in Slurry (ml) | | | | | | | |
|---|---|---|---|---|---|---|---|---|
| | Stone dust | Baked rice bran | Solidifying material | Mountain sand | Water | Solidifying material | Solidification | Water resistance |
| Example 1 | 100 | 100 | 50 | 300 | 75 | Calcined plaster | Good | Good |
| Example 2 | 100 | 100 | 50 | 600 | 200 | Calcined plaster | Good | Good |
| Example 3 | 100 | 100 | 50 | 300 | 75 | Hydrated lime | Good | Good |
| Example 4 | 100 | 100 | 50 | 600 | 200 | Hydrated lime | Good | Good |
| Comparative Example A | 100 | 100 | 50 | 300 | 75 | Plaster | Good | Poor |
| Comparative Example B | 100 | 100 | 50 | 600 | 200 | Plaster | Good | Poor |

As shown in Table 1, in both the slurries of Examples using the calcined plaster and the hydrated lime as the solidifying material and the slurries of Comparative Examples using the plaster as the solidifying material, the solidifications were confirmed regardless of the mixed amounts of the mountain sand and water.

However, in the example using the calcined plaster and the hydrated lime as the solidifying material, the sample did not change even when water was poured over the solidified sample from above. In the comparative example using the plaster as the solidifying material, the sample dissolved when water was poured over the sample from above.

From the above results, it was confirmed that use of the soil paving material according to the present invention allows forming the water-resistant and fixed soil pavement layer (FIG. 1C) regardless of the mixed amounts of the mountain sand and water, and allows the appropriate soil pavement with the adjusted amounts of the mountain sand and the like according to the use application.

B. Second Embodiment

Figure 3A:
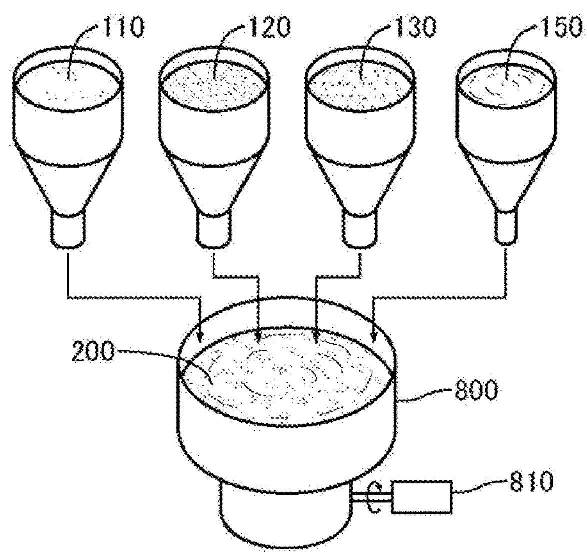
FIG. 3A is an explanatory view illustrating a soil pavement performed as a second embodiment.
Figure 3B:
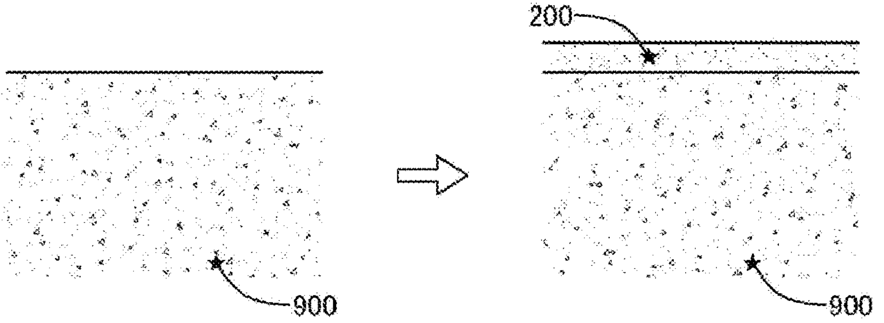
FIG. 3B is an explanatory view illustrating the soil pavement performed as the second embodiment.
Figure 3C:
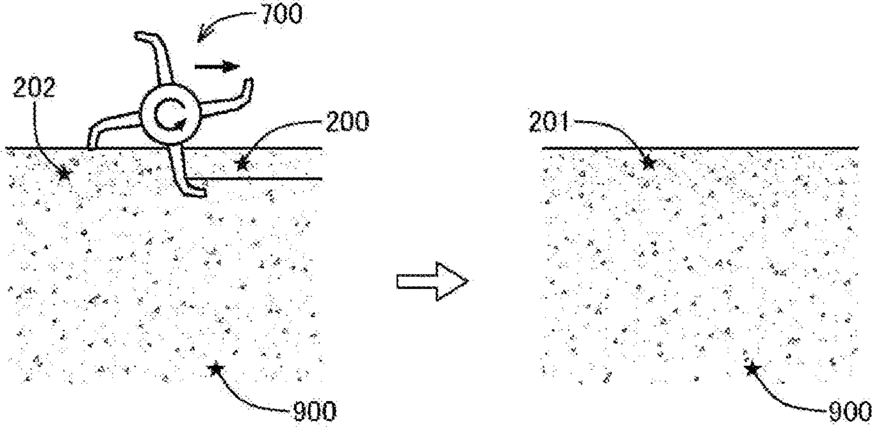
FIG. 3C is an explanatory view illustrating the soil pavement performed as the second embodiment.

FIG. 3A to FIG. 3C are explanatory views illustrating a soil pavement performed as a second embodiment. FIG. 3A illustrates a preparation of a slurry 200 for forming the soil pavement layer, and FIG. 3B and FIG. 3C illustrate a step of performing the soil pavement on the topsoil 900 using the slurry 200.

As shown in FIG. 3A, the second embodiment is different from the first embodiment in that the slurry 200 is prepared using the stone dust 110, the baked rice bran 120, and the calcined plaster 130 as the soil paving material, and water 150, that is, the mountain sand as the fine aggregate is not used for the preparation of the slurry 200. Since other points are the same as those of the first embodiment, a detailed description of the preparation of the slurry 200 is omitted.

The slurry 200 prepared in this manner is laid on the topsoil 900 as shown in FIG. 3B. After the slurry 200 is laid on the topsoil 900 and before the slurry 200 solidifies, as shown in FIG. 3C, the slurry 200 and the surface layer of the topsoil 900 are mixed by a rotor 700 of a cultivator or the like, thus forming a mixed layer 202 in which the slurry 200 and the topsoil 900 are mixed.

Then, by solidifying the formed mixed layer 202, the topsoil 900 is covered with the soil pavement layer 201 in which the mixed layer 202 is solidified. Covering the topsoil 900 with the fixed soil pavement layer 201 allows suppressing the muddying and scattering of the topsoil 900 covered with the soil pavement layer 201 and the soil pavement layer 201 itself as in the first embodiment.

Thus, the second embodiment also achieves the soil pavement having the higher water permeability and shock absorbency and the sufficient durability. Then, the environmental load caused by the soil pavement can be further effectively reduced as in the first embodiment.

Furthermore, since the second embodiment mixes the slurry 200 with the surface layer of the topsoil 900 to form the soil pavement layer 201 and eliminates the need for the transporting of the sand to the construction site of the soil pavement or the laying of the transported sand. Therefore, it becomes easier to perform the soil pavement on a large area. Meanwhile, the first embodiment forms the soil pavement layer 101 by laying the kneaded slurry 100 (FIG. 2B) on the topsoil 900 without using a cultivator or the like, thus allowing the facilitated construction of the soil pavement.

C. Modification

The present invention is not limited to the above-described embodiments, and can be implemented in various aspects without departing from the scope of the invention. For example, the following modifications are possible.

In each of the above-described embodiments, the stone dust 110, the baked rice bran 120, and the calcined plaster (the solidifying material) 130 are separately added in preparing the slurries 100 and 200. The stone dust, the baked rice bran, and the calcined plaster as the soil paving material may be mixed in advance. In this case, it is possible to prepare the slurry by mixing a premixed soil paving material, the mountain sand, and water, or by mixing a premixed soil paving material and water.

INDUSTRIAL APPLICABILITY

The present invention is applicable to the various soil pavements for suppressing muddying, scattering, or outflowing of the topsoil in the various places including school grounds, paths of parks, amusement parks, and the like, or structures such as hills in amusement parks, the surfaces of ancient tombs, and the like.

DESCRIPTION OF REFERENCE SIGNS

100, 200 Slurry
101, 201 Soil pavement layer
110 Stone dust
120 Baked rice bran
130 Calcined plaster
140 Mountain sand
150 Water
202 Mixed layer
700 Rotor
800 Mixer
810 Motor
900 Topsoil
GRD Ground
SCH School

The invention claimed is:

1. A soil paving material for paving soil on topsoil, comprising:
- a stone dust produced when a stone material is processed;
- a baked rice bran produced by baking rice bran into a partly carbonized state; and
- a solidifying material, wherein
- the solidifying material includes at least one of a calcined plaster and a hydrated lime.

2. The soil paving material according to claim 1, wherein the soil paving material contains the baked rice bran at a mix proportion of 80 to 120 in volume to 100 in volume of the stone dust and contains the solidifying material at a mix proportion of 20 to 80 in volume to 100 in volume of the stone dust.

3. The soil paving material according to claim 2, wherein the stone material includes an intermediate rock or an acid rock.

4. A soil paving method for paving soil on topsoil, comprising:
- a step of preparing a slurry by kneading the soil paving material according to claim 3, sand, and water; and
- a step of laying the slurry on the topsoil.

5. A soil paving method for paving soil on topsoil, comprising:
- a step of preparing a slurry by kneading the soil paving material according to claim 3, and water;
- a step of laying the slurry on the topsoil; and
- a step of mixing the slurry and a surface layer of the topsoil before the slurry solidifies.

6. A soil paving method for paving soil on topsoil, comprising:
- a step of preparing a slurry by kneading the soil paving material according to claim 2, sand, and water; and
- a step of laying the slurry on the topsoil.

7. A soil paving method for paving soil on topsoil, comprising:
- a step of preparing a slurry by kneading the soil paving material according to claim 2, and water;
- a step of laying the slurry on the topsoil; and
- a step of mixing the slurry and a surface layer of the topsoil before the slurry solidifies.

8. The soil paving material according to claim 1, wherein the stone material includes an intermediate rock or an acid rock.

9. A soil paving method for paving soil on topsoil, comprising:
- a step of preparing a slurry by kneading the soil paving material according to claim 8, sand, and water; and
- a step of laying the slurry on the topsoil.

10. A soil paving method for paving soil on topsoil, comprising:
- a step of preparing a slurry by kneading the soil paving material according to claim 8, and water;
- a step of laying the slurry on the topsoil; and
- a step of mixing the slurry and a surface layer of the topsoil before the slurry solidifies.

11. A soil paving method for paving soil on topsoil, comprising:
- a step of preparing a slurry by kneading the soil paving material according to any of claim 1, sand, and water; and
- a step of laying the slurry on the topsoil.

12. A soil paving method for paving soil on topsoil, comprising:
- a step of preparing a slurry by kneading the soil paving material according to claim 1, and water;
- a step of laying the slurry on the topsoil; and
- a step of mixing the slurry and a surface layer of the topsoil before the slurry solidifies.

* * * * *